Figure 1:
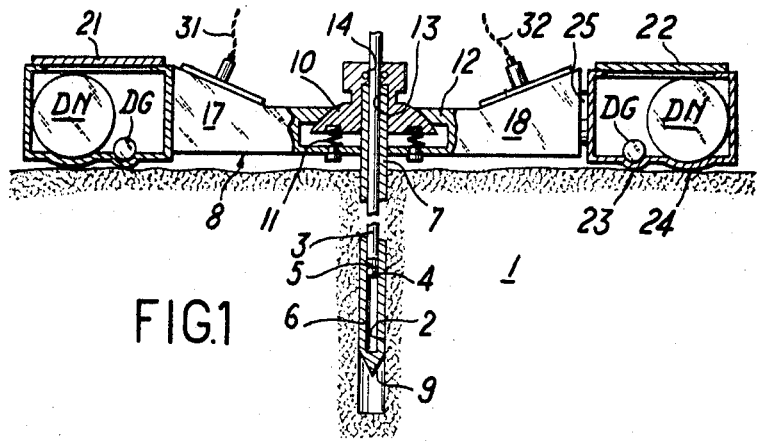

Feb. 18, 1969  B. F. WACK  3,428,806
APPARATUS FOR MEASURING THE HUMIDITY AND MASS OF SOILS
Filed July 25, 1966

United States Patent Office
3,428,806
Patented Feb. 18, 1969

3,428,806
APPARATUS FOR MEASURING THE HUMIDITY AND MASS OF SOILS
Bernard François Wack, St.-Martin-d'Heres, Isere, France, assignor to Electricite de France (Service National), Paris, France
Filed July 25, 1966, Ser. No. 567,484
Claims priority, application France, July 30, 1965, 26,679
U.S. Cl. 250—83.1     5 Claims
H01j 39/32

This invention relates to a method of and an apparatus for measuring the humidity of a material, and is intended more particularly for the investigation of soils.

In soil investigation, in particular, a technique of checking materials by radioactive radiation has recently been developed, which makes use of gamma-rays for measuring the mass per unit of volume and neutrons for measuring the humidity per unit of volume. The humidity rate by weight is deduced from these two measurements.

The humidity per unit of volume is determined by thermalisation of fast neutrons in the prior art methods. To this end, a device is used which is calibrated by means of known materials and which contains a fast neutron emitter source and detector for the slow neutrons resulting from the diffusion of the fast neutrons in the material, the source and the detector both being situated on the same side of the material under investigation.

These methods have disadvantages due mainly to the influence of the characteristics of the material under investigation on the measurement itself. For example:

(a) The volume of material used for the measurement and defined by the radius of the sphere of diffusion of the neutrons emitted, is imposed by the diffusion characteristics of such material; since the latter are a function of the hydrogen content, the measured volume therefore varies with the humidity of the material under investigation.

(b) The result obtained does not correspond to the mean humidity value throughout the measured volume because of the existence of a gradient. The outer layers of the diffusion sphere have less influence on the detected radiation than the layers closer to the emitter.

(c) The detector and the neutron source are disposed on the same side of the material under investigation and generally on the surface thereof, particularly in the case of the soil under investigation in the field, so that the measurement is greatly influenced by the surface condition of the material.

To obviate these disadvantages in methods in which the humidity is measured by neutron diffusion, an attempt has already been made to use direct transmission of thermal neutrons through the material (the source which emits just the thermal neutrons and the detector being situated on either side of a determined volume of material under investigation), on a principle comparable to that applied in direct transmission of gamma rays which has been developed successfully for measuring mass per unit of volume. However, as far as humidity measurement is concerned it was hitherto impossible to provide a method using direct transmission of neutrons which could be applied in the field. Attempts making use of the transmission of thermal neutrons were unable to go beyond the laboratory stage because the thickness likely to be used in the measurement cannot exceed a few centimetres.

The present invention relates to a method of measuring the humidity of a material without the disadvantages of the prior art methods using neutron diffusion but which nevertheless enables large volumes of material to be investigated.

This method of measuring the humidity of a material is intended more particularly, but not exclusively, for measuring the humidity of soils and comprises the emission of a beam of fast neutrons on one side of a volume of the said material, said method being characterised in that it comprises the selective detection, on the opposite side of the said volume of material, of the neutrons transmitted directly through the material, to the exclusion of the diffused neutrons.

The invention also relates to apparatus for performing the above method, wherein a fast neutron source and means for selective detection of neutrons of an energy higher than the thermal neutrons are provided on each side of a volume of the material under investigation.

Amongst the numerous advantages of the invention, the following points may be stressed, more particularly in their application to soil investigation:

(a) There is no longer any limit on the measured volume;

(b) The volume varies very little with the humidity of the sample;

(c) The measurement obtained is very close to the mean value; and (d) The measurement is independent of the surface condition of the material.

An additional practical advantage is the ease with which humidity measurement according to the invention can be associated with measurement of mass per unit volume by gamma-ray transmission. Since these two measurements are both carried out by transmission, it is a simple matter to apply them to the same sample of material.

Figure 2:
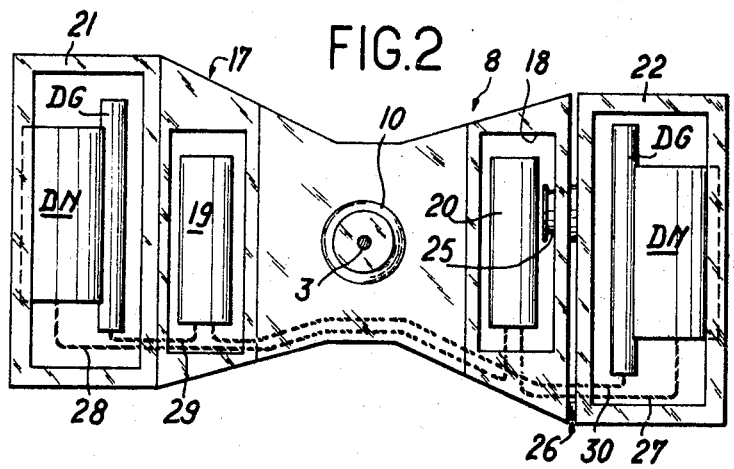
Figure 3:
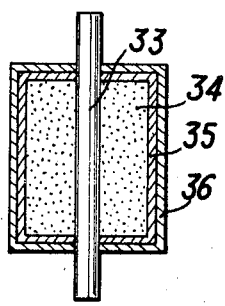

The invention will now be described by way of example with reference to the accompanying drawings in which:

FIGURE 1 is a diagrammatic side elevation of the apparatus for simultaneous investigation of humidity and mass per unit of volume of the soil, FIGURE 2 is a corresponding plan view to FIGURE 1 with the covers removed, and FIGURE 3 is a detail view showing the structure of a fast neutron detector.

The embodiment described relates to the combined measurement of humidity and mass per unit of volume of one and the same sample of material under investigation. To this end the apparatus used comprises an emitter consisting of a fast neutron source associated with a gamma-ray source and detection means consisting of at least one detector for neutrons of an energy greater than the thermal level and a gamma-ray detector. The apparatus is so designed that the emitter and the detection means can be disposed on each side of a sample under investigation. The intensity of the radiation detected by the two detectors for the given sources enables both the humidity per unit of volume of the sample and its density per unit of volume to be measured after calibration of the apparatus, so that the rate of humidity by weight can then be determined.

The apparatus described hereinbelow is intended more particularly for the measurement of soil humidity. In this apparatus the emitter is carried by a rod which can be introduced into the soil. Also, two detection units each comprise a detector for neutrons of an energy greater than the thermal level and a gamma-radiation detector. During measurement they are disposed at the surface of the ground symmetrically with respect to the rod. The total result is determined from the average of the radiation detected by either of these units, so that the influence of any positioning errors between the rod and the detectors when the apparatus is used in the field can be eliminated.

According to the embodiment selected and illustrated by way of example, the apparatus is intended for checking a sample of ground 1 in which a borehole 2 has previously been made. The apparatus comprises source holder rod 3, the bottom end of which bears a source 4 of fast neutrons, preferably consisting, for example, of a mixture of americium and beryllium which has the advantage, particularly over radium, of not emitting high-energy gamma-rays. This neutron source 4 is topped by a gamma-ray source 5, for example based on cesium 137.

The borehole 2 is previously lined with a guide tube 6 having an end portion 7 which is left to project above the soil, and a closed base 9, the portion 7 being capped by the receiver 8, which for this purpose has in the centre a centring guide means consisting of a swivel joint 10 which is resiliently held in contact with a spherical seating 12 by means of a series of springs 11. The swivel joint 10 has an axial bore 13 adapted to fit over the guide tube 7, with an end portion 14 of reduced diameter for the passage of the source holder rod 3.

Two compartments 17 and 18 formed in the receiver on either side of the centring guide 10 act as housings for electronic equipment and, for example, contain preamplifiers 19 and 20 respectively intended for two measuring networks. At the ends of the resulting receiver are two similar detection units 21 and 22 each containing a gamma-radiation detector DG and a neutron detector DN, which in the example selected are disposed on the inside and the outside respectively of the unit. These detectors, which are of general cylindrical shape, are housed in depressions, e.g. 23 and 24, formed for this purpose in the bottom of the respective casing. The receiver is supported on these depressions which also act as feet and can slightly penetrate into the soil so that the detectors are closest to the surface of the sample under study. In order to improve this contact and the stability of the apparatus still further, one of the detection units, in this case unit 22, is connected to the reciver by a pivot 25 which allows it to pivot by an amount limited, for example to about 10°, by a stop 26. As will readily be seen, this arrangement in conjunction with the swivel joint mounting of the centring guide enables the receiver to be more satisfactorily adapted to any irregularities in the surface of the sample and/or any defects in respect of the perpendicular position of the borehole.

Connecting cables 27 and 28 connect the neutron detectors to the preamplifier 20 while cables 29 and 30 connect the gamma detectors to the preamplifier 19. Other cables 31 and 32 (FIG. 1) provide the supply to the receiver and connection to conventional amplification and measuring equipments which do not form part of the invention.

FIGURE 3 shows the structure of a neutron detector DN according to the invention. A conventional detector tube 33, for example of the boron fluoride type, sensitive to thermal neutrons, is disposed at the centre of a moderator chamber 34, the moderator consisting of paraffin for example, said chamber being enclosed in a filter jacket which in this case consists of an indium foil 35 and a cadmium foil 36. The filter provides practically complete elimination of thermal energy neutrons while allowing an appreciable fraction of neutrons to pass originating from an energy greater than the thermal level, i.e. fast epithermal neutrons. Only these fast epithermal neutrons will therefore act on the detector 33 after their energy level has been reduced inside the moderator 34.

By way of example, excellent results have been obtained with a filter jacket which is opaque to neutrons of an energy below 1 ev., i.e. by detecting neutrons which at the outlet of the chamber in question have an energy ranging between 1 ev., volume determined by the filter jacket, and 5 mev., the value of the radiation emitted by the source. In fact, however, since the low-energy radiation has little chance to pass through the paraffin moderator chamber, most of the radiation detected has an energy ranging between 0.1 and 5 mev.

Experiment has shown that the count rate measured with an apparatus constructed in this way has an excellent correlation with the humidity per unit of volume of the thickness of material intercepted on the source-detector axis; the relative accuracy of humidity measurements carried out with intercepted soil thicknesses of 35 cm. can be estimated at about 2%.

I claim:

1. Apparatus for measuring the humidity and mass of a soil comprising a fast neutron source on one side of a volume of the soil, means for selective detection of neutrons of an energy greater than thermal neutrons on the opposite side of the volume of soil, said neutron detecting means comprising a filter passing fast epithermal neutrons and a neutron detector, said filter being disposed between the volume of soil and said detector, moderator material surrounding said detector, a gamma-ray source closely adjacent said fast neutron source and at least one gamma-ray detector immediately adjacent said neutron detecting means and in the solid angle formed by said fast neutron source, said gamma-ray source and said neutron detecting means.

2. Apparatus as described in claim 1 including a holder rod for said sources, a receiver, a swivel joint articulated on said receiver slidably receiving said rod and two casings on said receiver enclosing said detecting means and said detector, said casings being disposed symmetrically with respect to said rod.

3. Apparatus as described in claim 1 including means on said swivel joint for centering said casings on a bore hole tube.

4. Apparatus as described in claim 1, at least one of said casings being pivotally mounted on said receiver.

5. Apparatus as described in claim 1, said detector detecting energy between 0.1 and 5 mev.

References Cited

UNITED STATES PATENTS

| | | | |
|---|---|---|---|
| 2,712,081 | 6/1955 | Fearow et al. | 250—83.1 |
| 2,952,775 | 9/1960 | Guinn | 250—83.1 |

FOREIGN PATENTS

| | | |
|---|---|---|
| 863,886 | 3/1961 | Great Britain. |

RALPH G. NILSON, *Primary Examiner.*

M. J. FROME, *Assistant Examiner.*

U.S. Cl. X.R.

250—83.3, 83.6